(12) United States Patent
Ahmed (10) Patent No.: US 9,445,108 B1
(45) Date of Patent: Sep. 13, 2016

(54) DOCUMENT COMPRESSION WITH NEIGHBORHOOD BIASED PIXEL LABELING

(71) Applicant: International Business Machines Corporation, Armonk, NY (US)

(72) Inventor: Mohamed N. Ahmed, Leesburg, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/721,758

(22) Filed: May 26, 2015

(51) Int. Cl.
| G06K 9/36 | (2006.01) |
| H04N 19/179 | (2014.01) |
| H04N 19/182 | (2014.01) |
| H04N 19/142 | (2014.01) |
| G06F 17/30 | (2006.01) |
| G06T 7/00 | (2006.01) |
| H04N 19/426 | (2014.01) |

(52) U.S. Cl.
CPC ....... *H04N 19/179* (2014.11); *G06F 17/30017* (2013.01); *G06T 7/0081* (2013.01); *H04N 19/142* (2014.11); *H04N 19/182* (2014.11); *H04N 19/426* (2014.11); *G06T 2207/20141* (2013.01); *G06T 2207/20144* (2013.01); *G06T 2207/20148* (2013.01)

(58) Field of Classification Search
USPC ....... 382/244, 232, 239, 176, 173, 164, 190, 382/145; 250/398, 492.2, 545; 348/86, 125; 716/52, 53, 55
See application file for complete search history.

(56) References Cited

U.S. PATENT DOCUMENTS

| 5,293,430 A | 3/1994 | Shiau et al. |
| 5,555,556 A | 9/1996 | Ozaki |
| 5,649,025 A | 7/1997 | Revankar |
| 5,745,596 A | 4/1998 | Jefferson |
| 5,765,029 A | 6/1998 | Schweid et al. |
| 5,767,978 A | 6/1998 | Revankar et al. |
| 5,778,092 A | 7/1998 | MacLeod et al. |
| 5,850,474 A | 12/1998 | Fan et al. |
| 6,175,650 B1 | 1/2001 | Sindhu et al. |

(Continued)

OTHER PUBLICATIONS

Eom et al; A Block Wavelet Transform for Sub-image Coding/Decoding, http://proceedings.spiedigitallibrary.org/ on Jan. 13, 2015 Terms of Use: http://spiedl.org/terms, SPIE vol. 2669 / 169, 1996.

(Continued)

*Primary Examiner* — Anh Do
(74) *Attorney, Agent, or Firm* — Garg Law Firm, PLLC; Rakesh Garg; Matthew Chung (57) ABSTRACT

To compress a document, a number of edges present in a selected portion of the document are counted to determine whether the number of edges exceeds a threshold. When the number of edges exceeds the threshold, a pixel is selected from the portion and a set of neighboring pixels is identified for the pixel. For each neighboring pixel in a subset of the neighboring pixels, a corresponding label of the neighboring pixel is identified. A mask layer contains labels of pixels in the portion where a label of the selected pixel is biased using labels of neighboring pixels in the subset of the neighboring pixels. The selected pixel is designated to a foreground or a background layer of the document according to the label of the selected pixel. A compressed document is constructed corresponding to the document using the mask layer, the foreground layer, and the background layer.

19 Claims, 7 Drawing Sheets

(56) References Cited

U.S. PATENT DOCUMENTS

| | | |
|---|---|---|
| 6,272,255 B2 | 8/2001 | de Queiroz et al. |
| 6,275,620 B2 | 8/2001 | de Queiroz et al. |
| 6,324,305 B1 | 11/2001 | Holladay et al. |
| 6,334,001 B2 | 12/2001 | de Queiroz et al. |
| 6,608,928 B1 | 8/2003 | Queiroz |
| 6,608,930 B1 * | 8/2003 | Agnihotri ......... G06F 17/30796 382/173 |
| 7,120,297 B2 | 10/2006 | Simard et al. |
| 7,729,546 B2 | 6/2010 | Ahmed et al. |
| 7,783,117 B2 * | 8/2010 | Liu ......................... G06K 9/38 382/164 |
| 7,899,258 B2 * | 3/2011 | Liu ......................... G06K 9/38 382/164 |
| 8,532,437 B2 | 9/2013 | Christiansen |
| 2008/0175476 A1 | 7/2008 | Ohk et al. |

OTHER PUBLICATIONS

Software Patent Institute et al.; Distributed Image Processing with the Research Signal Processor, Mar. 30, 2007.

Software Patent Institute et al.; Substantial Constructive Induction Using Layered Information Compression: Tractable Feature Formation in Search (revised), Apr. 20, 2007.

* cited by examiner

FIGURE. 3
PRIOR-ART

DOCUMENT COMPRESSION WITH NEIGHBORHOOD BIASED PIXEL LABELING

TECHNICAL FIELD

The present invention relates generally to a method, system, and computer program product for document compression. More particularly, the present invention relates to a method, system, and computer program product for document compression with neighborhood biased pixel labeling.

BACKGROUND

Document or image compression is collectively referred to herein as "document compression" or simply, "compression". Document compression addresses the problem of reducing the amount of data required to represent a digital content of a given document or image. The underlying principle of the reduction process in document compression is the removal of redundant data.

Compression techniques generally fall into two broad categories—lossless and lossy. A lossless compression preserves the information in that it allows the data of the document or image to be compressed and decompressed without the loss of information. While the information reproductions from a lossless compression results in the original information, in many circumstances, lossless compression provides little or no reduction in the data size. On the other hand, lossy compression often provides comparatively higher levels of data reduction but result in a less than perfect reproduction of the original information.

For example, lossless compression methods such as Lempel-Ziv (LZ) do not perform particularly well on scanned images and achieve little to no size reduction from the compression. While lossy compression methods, such as Joint Photographic Experts Group (JPEG) compression, work fairly well on continuous-tone pixel maps in reducing their size, they do not work particularly well on the parts of the page containing text, as the clarity of the text is lost in the reproduction due to data loss during compression.

SUMMARY

The illustrative embodiments provide a method, system, and computer program product for document compression with neighborhood biased pixel labeling. An embodiment includes a method for compressing a document. The embodiment counts a number of edges present in a selected portion of the document. The embodiment determines whether the number of edges exceeds a threshold number of edges. The embodiment selects, responsive to the number of edges exceeding the threshold number of edges, a pixel from the portion. The embodiment identifies, for the pixel, a set of neighboring pixels. The embodiment identifies, for each neighboring pixel in a subset of the set of neighboring pixels, a corresponding label of the neighboring pixel. A mask layer corresponding to the document contains labels of pixels in the portion. The embodiment biases, in the mask layer, a label of the selected pixel using labels of neighboring pixels in the subset of the neighboring pixels. The embodiment designates, according to the label of the selected pixel, the selected pixel to one of a foreground layer corresponding to the document and a background layer corresponding to the document. The embodiment constructs, corresponding to the document, a compressed document using the mask layer, the foreground layer, and the background layer.

Another embodiment includes a computer program product for compressing a document, the computer program product comprising one or more computer-readable storage devices, and program instructions stored on at least one of the one or more storage devices.

Another embodiment includes a computer system for compressing a document, the computer system comprising one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that one approach to satisfy the compression needs of differing types of data has been to use the Mixed Raster Content (MRC) format to describe the original information. In an MRC representation, the information, e.g., a composite image having text intermingled with color or gray scale information is segmented into two or more planes or layers, generally referred to as the upper and lower planes or layers. A selector plane or layer is generated to indicate, for each pixel, which of the image layers contains the actual image data that should be used to reconstruct the final output image.

Separating the layers in this manner can improve the compression of the image because the data can be arranged such that the layers are smoother and more compressible than the original image. Separation of layers also allows different compression methods to be applied to the different layers. Thus, a compression technique that is appropriate for the type of data residing on a particular layer can be applied to that layer.

For example, assume that a color or gray scale pixel map represents a document. An MRC process decomposes the pixel map into a three-layer representation—a reduced-resolution foreground layer, a reduced-resolution background layer, and a high-resolution binary selector layer. The reduced-resolution is a resolution, e.g., pixels per inch, that is lower than a resolution of the original data. The foreground layer contains the color or gray scale information of foreground items such as text. The background layer contains the color or gray scale information for the background of the page and the continuous tone pictures that are contained on the page. The selector layer stores information for selecting from either the foreground layer or background layer during decompression.

The illustrative embodiments recognize that the MRC method classifies pixels according to their frequency in the original data. Generally, the MRC method classifies high frequency pixels, to wit, pixels appearing at or above a threshold number of times, as text pixels and places them on the foreground layer. Low frequency pixels, to wit, pixels appearing at a lower than a threshold number of times, as image pixels and places them on the background layer.

Accordingly, the illustrative embodiments recognize that the MRC method often misclassifies pixels belonging to halftone dots larger than a certain size in the original data and noise—such as the salt and pepper dots on some document images, as high frequency pixels and classifies them as text. This misclassification increases the size of the compressed data in the MRC method.

The inventors are unaware of any general recognition of these problems by fellow practitioners. The illustrative embodiments used to describe the invention generally address and solve the above-described problems and other problems related to document compression. The illustrative embodiments provide a method, system, and computer program product for document compression with neighborhood biased pixel labeling.

An embodiment decomposes an original document into three planes or layers—an upper plane or upper layer, a lower plane or lower layer, and a selector plane or selector layer. The selector plane or layer is also known as a selection plane or selection layer, or a mask plane or mask layer. The embodiment includes text areas in a high-resolution selector layer. The embodiment creates the upper layer as a low-resolution foreground, representing the color of the text. The embodiment creates the lower layer as a low-resolution background containing the remaining pixels.

The low-resolution or reduced resolution is any resolution at or below the resolution of the original document, at which a reader or perceiver of the document cannot distinguish between resolution values. For example, to a human eye, a document appears to be indistinguishable at 600 pixels per inch and 300 pixels per inch. Similarly, to a scanner tool or application, the text is just as readable whether the resolution is 300 pixels per inch or 60 pixels per inch. Reducing the resolution in an embodiment is optional and not necessary for the other operations of the embodiment.

Fuzzy c-means (FCM) algorithm is a known algorithm that is used for clustering pixels into a foreground layer and a background layer. An embodiment modifies the FCM algorithm to implement a new modified fuzzy c-means clustering technique. According to this modified technique, the labeling of a pixel is influenced by the labels of the pixels that are in the immediate neighborhood of the pixel.

A label of a pixel is a designation whether the pixel belongs in the foreground layer or the background layer. The label of a pixel can be indicated using a Binary 0 or 1 value. As a non-limiting example, the Binary value of 0 is used as a label of a pixel to indicate that the pixel should be sent to the background layer. As a non-limiting example, the Binary value of 1 is used as a label of a pixel to indicate that the pixel should be sent to the foreground layer. A label of a pixel is recorded, stored, or saved in the selection layer.

An immediate neighborhood of a pixel includes those pixels that are immediately adjacent to the pixel, without any intervening pixels between the pixel and a neighborhood pixel. For example, if a pixel has a quadrilateral shape and if the pixels are arranged in rows and columns, a pixel would have eight neighbors—four neighboring pixels on each of the four sides of the pixel, and four neighboring pixels at each of the four vertices of the pixel.

Each neighborhood pixel also has a label. The labels of the neighborhood pixels of a given pixel influence the label of the pixel. Generally, according to an embodiment, the effect of the neighborhood labels acts as a regularizer and biases the label of the given pixel. This manner of assigning a label value to a pixel is called piecewise homogeneous labeling (PHL). The modification to the fuzzy c-means algorithm comprises PHL.

Furthermore, an embodiment applies the PHL modification in a block-by-block manner. Specifically, the embodiment divides the original document into a number of overlapping blocks of size n units by m units (n×m blocks), where n and m are any suitable number of units chosen according to an implementation. The units can be a measurement unit such as inches or centimeters, or a count, such as pixels per inch or dots per inch (DPI). The embodiment applies the modified FCM to an n×m block and labels the pixels in that block as described herein.

The illustrative embodiments are described using single-bit Binary label values and three layers only as non-limiting examples. An embodiment can be adapted to use more than two label values to assign the pixels to more than one foreground layer, more than one background layer, or a combination thereof. Such adaptations are contemplated within the scope of the illustrative embodiments.

A method of an embodiment described herein, when implemented to execute on a device or data processing system, comprises substantial advancement of the functionality of that device or data processing system in compressing documents. For example, prior-art lossless compression results in insignificant compression in many common circumstances, prior-art lossy compression results in poor reproduction results upon decompression, and prior-art FCM is prone to misclassification of pixels resulting in bloated compressed documents. The embodiments use the classification of the neighborhood pixels to bias the classification of a pixel. Operating in a manner described herein, an embodiment significantly reduces the size of the compressed document while preserving the information from the original document. Such manner of compressing documents is unavailable in presently available devices or data processing systems. Thus, a substantial advancement of such devices or data processing systems by executing a method of an embodiment improves document compression and results in significant saving of data storage space without loss of information.

The illustrative embodiments are described with respect to certain documents, pixels and pixel shapes, blocks, labels, planes or layers, neighborhoods, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
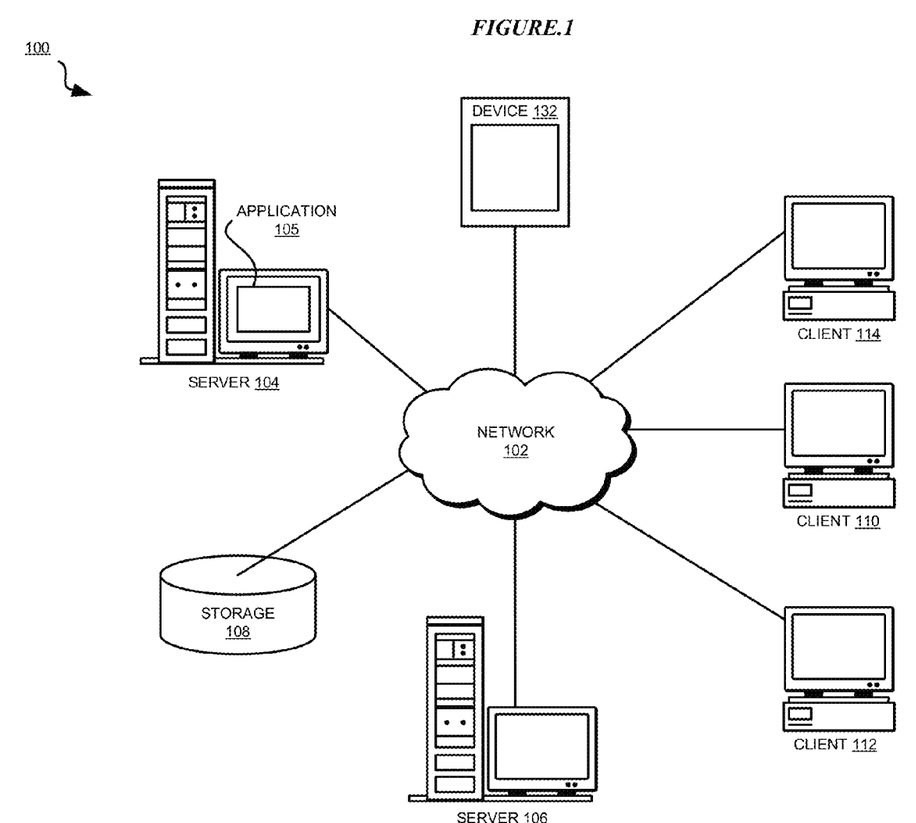
FIG. 1 depicts a block diagram of a network of data processing systems in which illustrative embodiments may be implemented.
Figure 2:
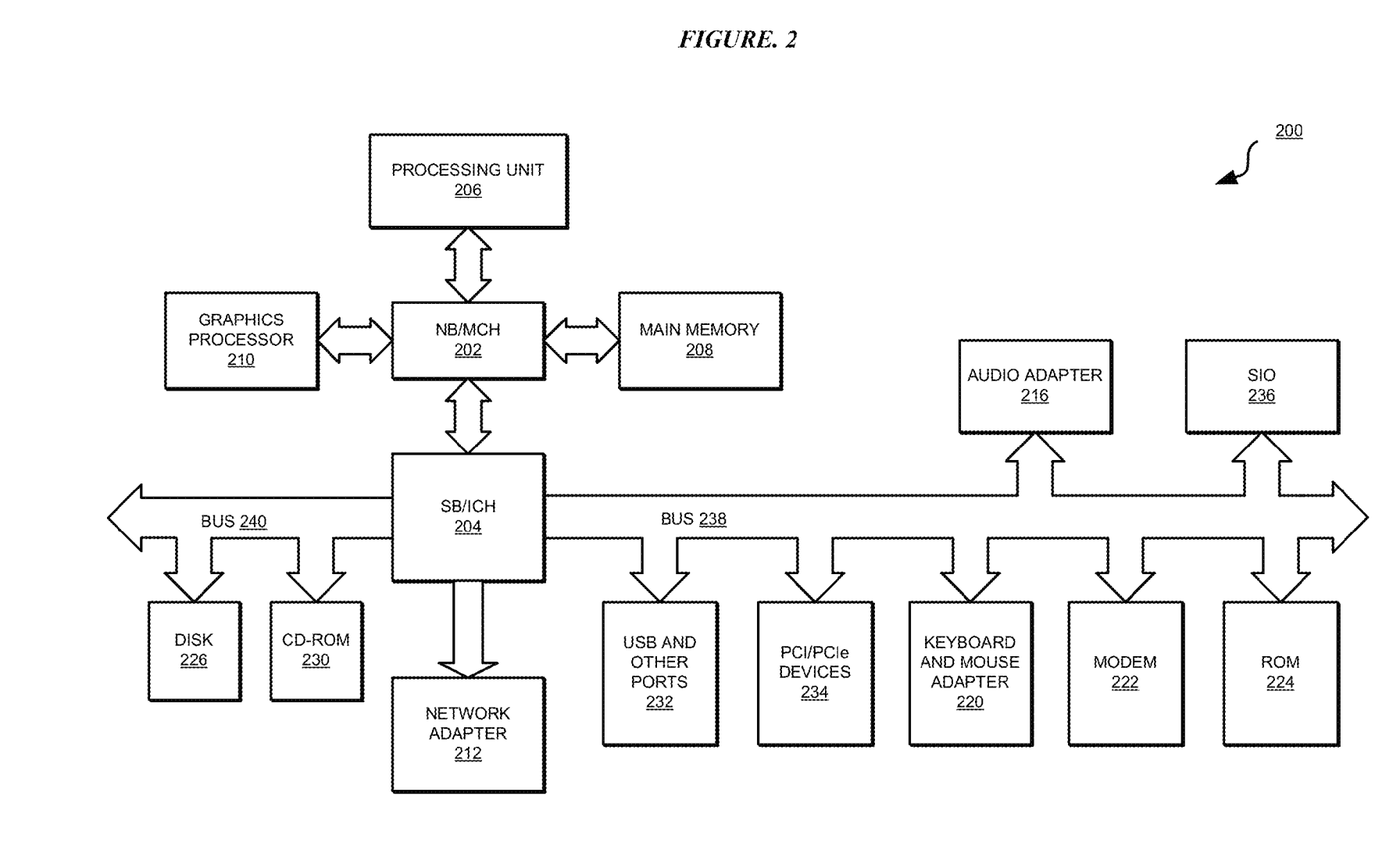
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Application 105 implements an embodiment described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
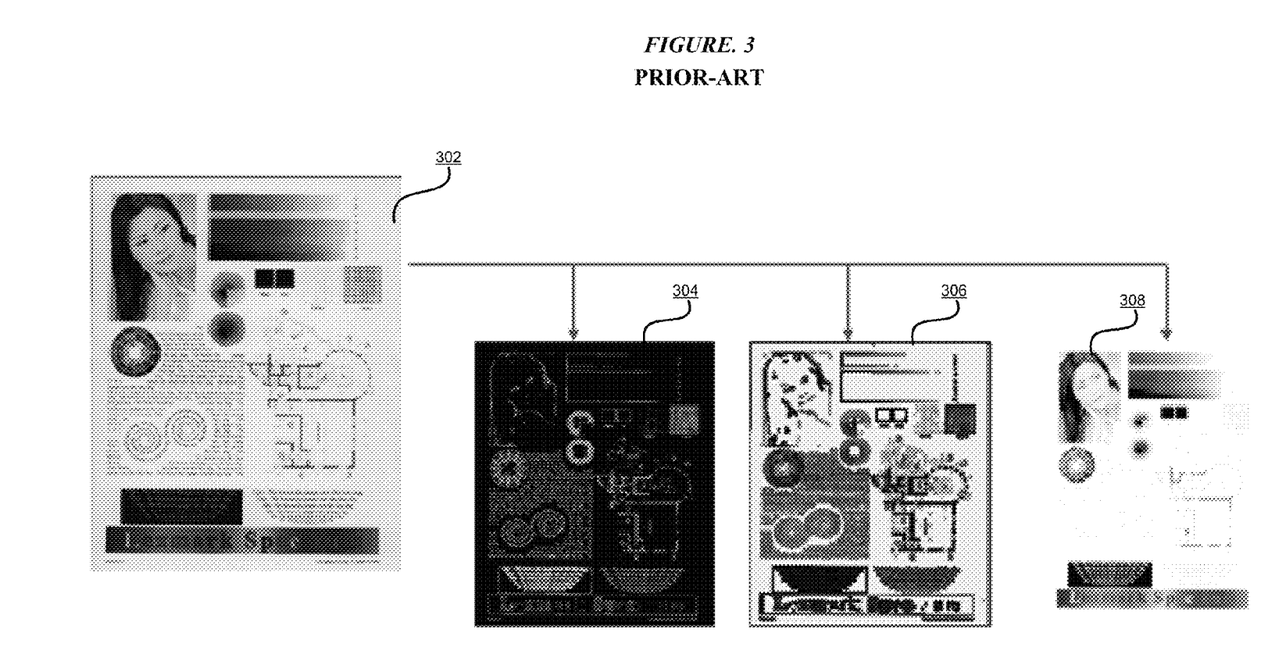
FIG. 3 depicts a block diagram of an example document compression method in accordance with an illustrative embodiment.

With reference to FIG. 3, this figure depicts a block diagram of an example document compression method in accordance with an illustrative embodiment. Document 302 is an example document with text and image data that is to be compressed. Document 302 is depicted in gray scale only due to limitations of patent application drawings. Document 302 can, and often does include colors as a part of the image portions of the document, text portions of the document, or a combination thereof.

A modified FCM process according to an embodiment breaks down document 302 into mask layer 304, foreground layer 306, and background layer 308. A decompression, reconstruction, or reproduction process uses mask layer 304 to reconstruct original document 302 from foreground layer 306 and background layer 308.

Foreground layer 306 contains text, edges, and line art colors. An embodiment prevents artifacts such as dots of a certain size or larger and noise information, e.g. imperfections due to dirt, dust, printing aberrations commonly seen as salt-and-pepper pixels scattered in a document, from appearing in foreground layer 306 as a part of the text or edges. Low resolution is usually sufficient to represent the region colors of these artifacts.

Background layer 308 contains images and graphics. Low resolution is sometimes sufficient to represent artifacts in this layer as long as the compression is set to high quality or minimal loss.

Figure 4:
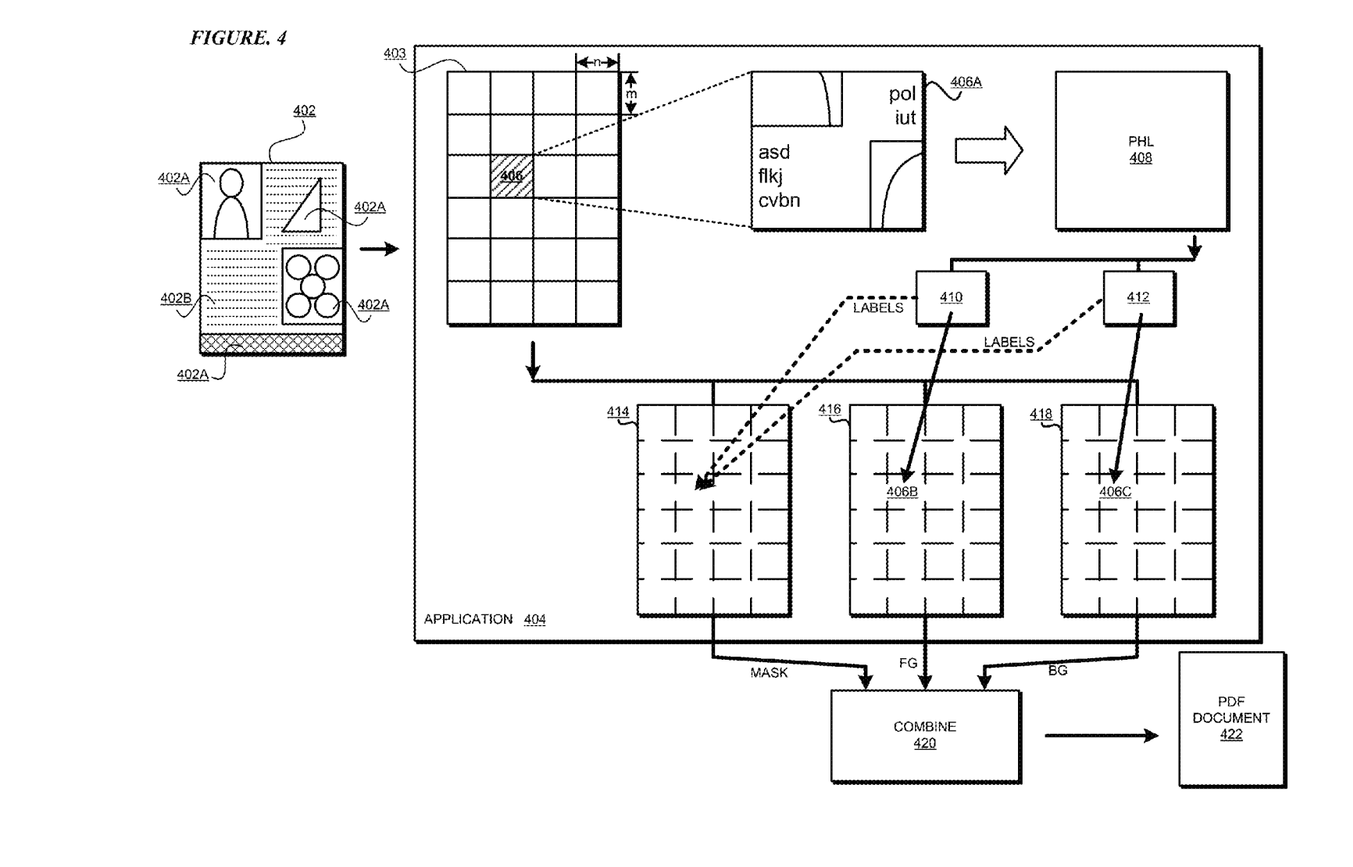
FIG. 4 depicts a block diagram of an example process for document compression with neighborhood biased pixel labeling in accordance with an illustrative embodiment.

With reference to FIG. 4, this figure depicts a block diagram of an example process for document compression with neighborhood biased pixel labeling in accordance with an illustrative embodiment. Document 402 is an example of document 302 in FIG. 3, and has similar characteristics. For example, document 402 can include any number or types of graphics or images 402A located anywhere in the document, any number or types of text 402B located anywhere in the document, or some combination thereof.

Application 404 is an example of application 105 in FIG. 1. Application 404 receives document 402 for compression as received document 403. Application 404 divides received document 403 into several n×m blocks, such as block 406. "n" and "m" values can be set as suitable in a given implementation for a given received document 403. While the n×m blocks such as block 406 are depicted as adjacent to one another, the blocks may be overlapping such that a portion of received document 403 may be included in two or more blocks.

Example contents of block 406 are shown in enlarged view 406A of block 406. View 406A shows that block 406 contains all or portions of letters of text 402B, all or portions of some images 402A, or some combination thereof. These contents have edges that are to be detected according to the modified FCM of an embodiment. For example, the thickness of a line of a letter includes an edge where pixel color or intensity changes or transitions by an amount that is greater than a threshold.

The threshold can be set to detect coarse transitions, for example, a transition of at least 0FFFFF hex, which would detect an edge in a transition from black (color value 000000 hex) pixel color to white (color value FFFFFF hex) pixel color, and few other edges in received document 403. The threshold can be set to detect fine transitions, for example, a transition of at least 00000A hex, which would detect an edge in a transition from pixel color value 0000AA hex to pixel color value 0000BA hex, and many other edges in received document 403.

Any degree of transition can thus be detected by appropriately setting a threshold, such as to detect "strong" edges, "medium" edges, or "light" edges. When multiple transitions are to be detected, such as to detect edges between different transitions, multiple thresholds can be set in a similar manner.

A block, such as block 406, which includes a threshold number of edges, is called an edge block. The threshold number of edges that must be present in a block for the block to be an edge block is configurable according to the implementation, according to received document 403, or a combination thereof. A very low threshold, e.g., 1 (an arbitrary example), allows any block with the low threshold number of edge transitions to qualify as an edge block. As will be apparent from this disclosure to those of ordinary skill in the art, a large number of edge blocks increases the computation costs and may also increase the size of a resulting compressed document due to a heavier foreground layer. A very high threshold, e.g., 1000 (an arbitrary example), allows only those block with the high threshold number of edge transitions to qualify as an edge block. As will be apparent from this disclosure to those of ordinary skill in the art, a very small number of edge blocks results in a poor quality reproduction of document 402 upon decompression.

For a block that does not qualify as an edge block, application 404 labels all pixels in such a block to be sent to the background layer. For a block that does qualify as an edge block, component 408, which implements the PHL mechanism according to an embodiment and performs the modified FCM processing of pixels of the edge block, labels the pixels of the edge block. Particularly, component 408 labels certain pixels (410) of example edge block 406 to be sent to foreground layer 416 in location 406B corresponding to the location of block 406 in document 403. Similarly, component 408 labels certain pixels (412) of example edge block 406 to be sent to background layer 418 in location 406C corresponding to the location of block 406 in document 403. Application 404 stores these labels corresponding to pixels 410 and 412 in mask layer 414.

When all the blocks are processed in this manner, mask layer 414, foreground layer 416, and background layer 418 are complete for received document 403. Application 404 outputs mask layer 414, foreground layer 416, and background layer 418 to combining component 420. Combining component 420 combines mask layer 414, foreground layer 416, and background layer 418, and outputs compressed document 422 corresponding to document 402. In one embodiment, compressed document 422 is a document in Portable Document Format (PDF).

Figure 5:
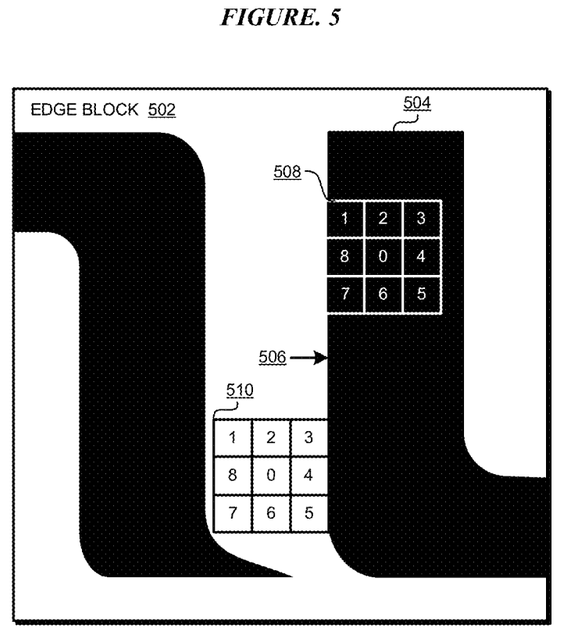
FIG. 5 depicts a block diagram of an example pixel neighborhood for PHL in accordance with an illustrative embodiment.

With reference to FIG. 5, this figure depicts a block diagram of an example pixel neighborhood for PHL in accordance with an illustrative embodiment. Edge block 502 is an example of edge block 406 in FIG. 4.

Only as an example and without implying any limitation thereto, assume the following—edge block 502 includes all or a part of letter 504, and edge 506 is an edge where pixels transition from the color of letter 504 to the background color.

Pixels that satisfy the transition thresholds in edge block 502 are initially labeled according to the thresholds. Thus, at least some of the pixels in edge block 502 will be labeled before proceeding to the next step. As to the next step, consider pixel labeled "0" in pixel neighborhood 508. Pixel 0 has, as neighbors, pixels 1, 2, 3, 4, 5, 6, 7, and 8 in neighborhood 508. Each of pixels 1-8 in neighborhood 508 are within the color of letter 504. Assume that some or all of pixels 1-8 in neighborhood 508 have been labeled as belonging to letter 504 and therefore belonging on foreground layer 416 in FIG. 4. Pixel 0 has not been labeled yet or has been labeled such that pixel 0 will cause salt and pepper type artifacts. Assume, for example, that pixels on foreground layer are labeled 1. Therefore, pixels 1-8 in neighborhood 508 are labeled 1 in this example.

Further assume that pixel 0 is of the background color due to an aberration in document 402. A prior-art method would put pixel 0 of neighborhood 508 on background layer 418. However, according to an embodiment, at the time of labeling pixel 0, PHL component 408 takes into account the labels that exist in neighborhood 508. Even if pixel 0 were of the background color due to an aberration in document 402, PHL component would label pixel 0 as "1" for placing pixel 0 of neighborhood 508 on foreground layer 416.

A similar operation would place pixels 0-8 of neighborhood 510 on background layer 418. Thus, individual pixel positions and colors, although being a factor, are not the only determiner in the placement of that pixel during decomposition for compression. The labeling of a pixel is biased, or influenced, by the labels that exist in the immediate neighborhood of the pixel in question.

The neighborhood pixels can be a mix of different labels, and an appropriate strategy is used to weigh them into the determination of a label for a pixel. One simplified example would determine whether there are more pixels in the neighborhood with one label as compared to the number of pixels in the neighborhood with the other label. Accordingly, the label of the pixel in question is biased towards the label that is in majority in the neighborhood. The final label of the pixel in question is only biased, not conclusively determined by the neighborhood. Other considerations for the labeling can also contribute to the determination of the final label for the pixel with the bias imparted by the neighborhood pixels.

Another generalized non-limiting manner of implementing the modified FCM with the PHL is as follows—

The standard FCM objective function for partitioning $\{x_k\}_{k=1}^N$ into C clusters is given by $$J = \sum_{i=1}^{c} \sum_{k=1}^{N} \mu_{ik}^p \|x_k - v_i\|^2 \quad (1)$$

Where $\{v_i\}_{i=1}^c$ are the prototypes of the clusters and the array $[u_{ik}]=U$ represents a partition matrix, $$U\left\{u_{ik} \in [0,1] \middle| \sum_{i=1}^{c} u_{ik} = 1 \,\forall\, k \text{ and } 0 < \sum_{k=1}^{N} u_{ik} < N \,\forall\, i\right\} \quad (2)$$

The parameter p is a weighting exponent on each fuzzy membership and determines the amount of fuzziness of the resulting classification. The FCM objective function is minimized when high membership values are assigned to pixels whose intensities are close to the centroid of its particular class, and low membership values are assigned when the pixel data is far from the centroid.

A modified FCM algorithm according to an embodiment is formulated by modifying the objective function of the standard FCM algorithm. This modified formulation allows the labeling of a pixel to be influenced by the labels in its immediate neighborhood.

According to an embodiment, a modification to equation (1), above, introduces a term that allows the labeling of a pixel to be influenced by the labels in its immediate neighborhood. The neighborhood effect acts as a regularizer and biases the solution towards piecewise-homogeneous labeling. Such regularization is useful in segmenting documents that have been corrupted by a variety of noise sources, such as by introduction of salt and pepper noise into a scan of a document. The modified objective function is given by $$J_m = \sum_{i=1}^{c} \sum_{k=1}^{N} \mu_{ik}^p \|x_k - v_i\|^2 + \frac{\alpha}{N_R} \sum_{i=1}^{c} \sum_{k=1}^{N} \mu_{ik}^p \left(\sum_{x_r \in N_k} \|x_r - v_i\|^2\right) \quad (3)$$

Where $N_k$ stands for the set of neighbors that exist in a window around $x_k$ and $N_R$ is the cardinality of $N_k$. The effect of the neighbors term is controlled by the parameter $\alpha$. The relative importance of the regularizing term is inversely proportional to the signal to noise ratio (SNR) of the image signal. Lower SNR would require a higher value of the parameter $\alpha$.

Formally, the optimization problem comes in the form min $J_m$ subject to $U \in U$ $$U, \{v_i\}_{i=1}^c, \{\beta_k\}_{k=1}^N \quad (4)$$

The new penalty term is minimized when the membership value for a particular class is large and the membership values for the other classes at neighboring pixels are small (and vice versa). In other words, it constrains the membership value of a class to be negatively correlated with the membership values of the other classes at neighboring pixels.

Membership Evaluation

The zero-gradient condition for the membership estimator can be rewritten as, $$u_{ik}^* = \frac{1}{\sum_{j=1}^{c} \left(\frac{D_{ik} + \frac{\alpha}{N_R}\gamma_i}{D_{jk} + \frac{\alpha}{N_R}\gamma_j}\right)^{\frac{1}{p-1}}} \quad (5)$$

where $$D_{ik} = \|x_k - v_i\|^2$$

$$\gamma_i = \left(\sum_{x_r \in N_k} \|x_r - v_i\|^2\right)$$

Cluster Prototype Updating $$v_i^* = \frac{\sum_{k=1}^{N} \mu_{ik}^p \left(x_k + \frac{\alpha}{N_R} \sum_{x_r \in N_k} x_r\right)}{(1+\alpha)\sum_{k=1}^{N} \mu_{ik}^p} \quad (6)$$

The other generalized non-limiting manner of implementing the modified FCM with the PHL ends here.

Figure 6:
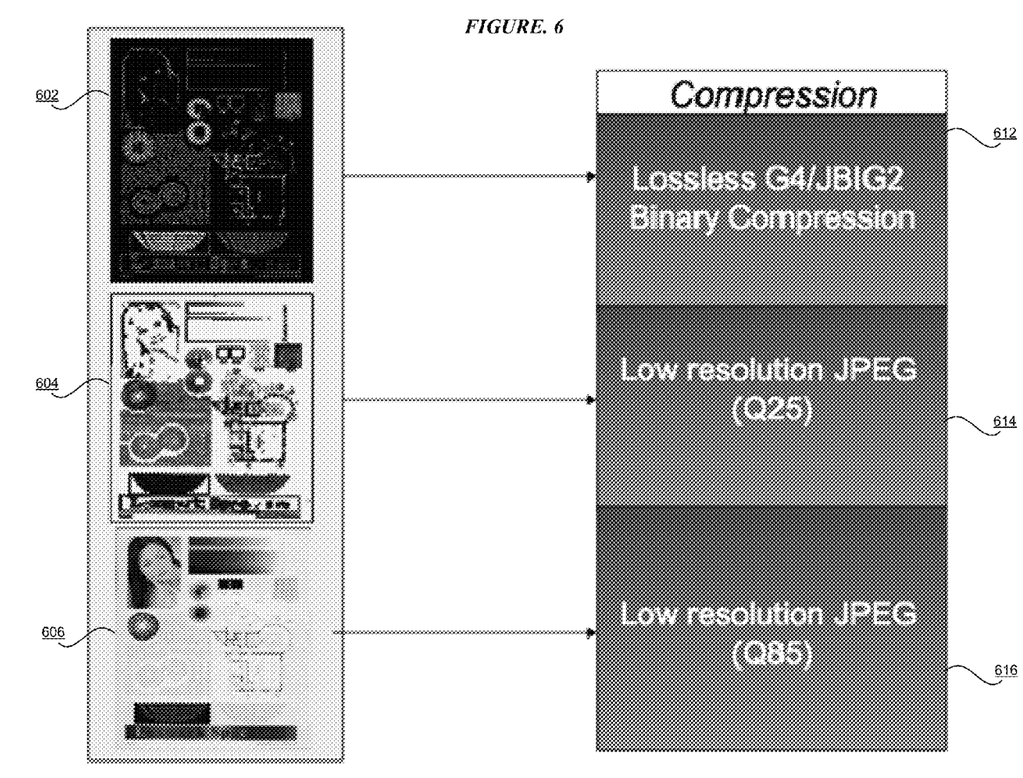
FIG. 6 depicts a block diagram of a compression of layers resulting from a modified FCM process in accordance with an illustrative embodiment.

With reference to FIG. 6, this figure depicts a block diagram of a compression of layers resulting from a modified FCM process in accordance with an illustrative embodiment. Mask layer 602 is an example of mask layer 414, foreground layer 604 is an example of foreground layer 416, and background layer 606 is an example of background layer 418 in FIG. 4.

Application 404 of FIG. 4 compresses each of layers 602, 604, and 606 according to the type of data stored in that layer. For example, mask layer 602 has binary data corresponding to the labels of the pixels of the original document as described elsewhere in this disclosure. Mask layer 602 should therefore be compressed using a Binary compression, preferably in a lossless manner. G4 and JBIG2 are some examples of such compression techniques that can be used to compress mask layer 602.

Because of the type of pixel information stored therein, foreground layer 604 can be compressed, for example, using a low resolution low quality compression, e.g., JPEG compression. Similarly, because of the type of pixel information stored therein, background layer 606 can be compressed, for example, using a low resolution high quality compression, e.g., JPEG compression.

Again, the quality and resolution of the various compressions depicted and described with respect to FIG. 6 are only examples and not intended to be limiting on the illustrative embodiments. These examples have been selected only to show that different compressions are usable with different layers according to the data stored in those layers. Depending upon a particular implementation, a particular document, a particular compression requirement, or a combination thereof, other compression techniques are similarly usable with layers 602, 604, and 606, and other similar layers, if any, within the scope of the illustrative embodiments.

Figure 7:
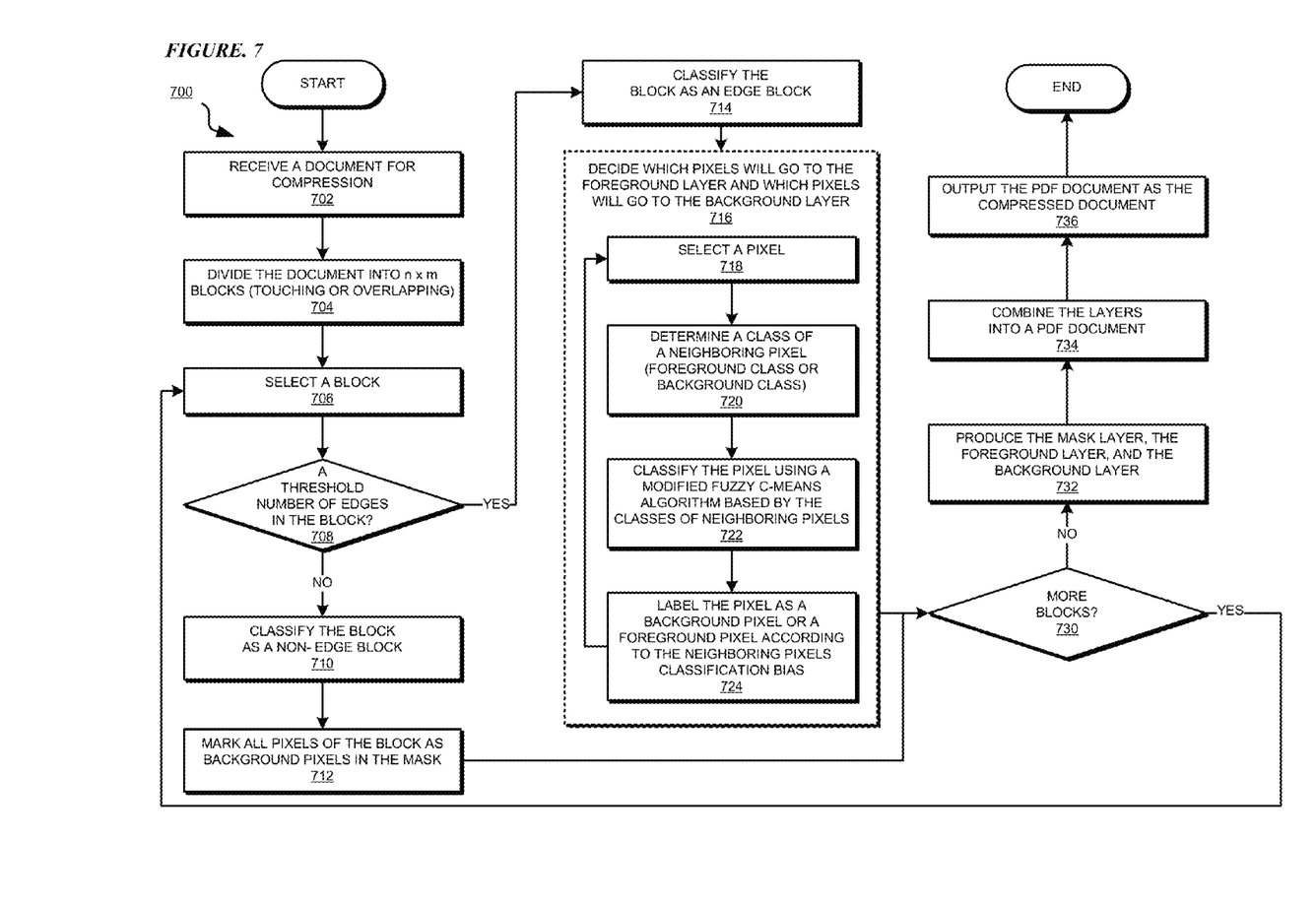
FIG. 7 depicts a flowchart of an example process for document compression with neighborhood biased pixel labeling in accordance with an illustrative embodiment.

With reference to FIG. 7, this figure depicts a flowchart of an example process for document compression with neighborhood biased pixel labeling in accordance with an illustrative embodiment. Process 700 can be implemented in application 404 in FIG. 4.

The application receives a document for compression (step 702). The application divides the document into n×m blocks that may be touching or overlapping (step 704).

The application selects an n×m block (step 706). The application determines whether the selected block includes at least a threshold number of edges (step 708). If the selected block does not include at least the threshold number of edges ("No" path of step 708), the application classifies the block as a non-edge block (step 710). The application marks, in the mask layer, all pixels of that selected block as background pixels (step 712). The application proceeds to block 730 thereafter.

If the selected block includes at least the threshold number of edges ("Yes" path of step 708), the application classifies the block as an edge block (step 714). The application then decides which pixels of the edge block will go to the foreground layer and which pixels of the edge block will go to the background layer (step 716).

Particularly, the application in executing block 716, selects a pixel from the edge block (step 718). The application determines a class of a neighboring pixel (step 720). A class of a pixel is a label of a pixel. Accordingly, a pixel whose label indicates that the pixel belongs in a foreground layer has a foreground class, and a pixel whose label indicates that the pixel belongs in a background layer has a background class.

The application classifies the selected pixel using a modified FCM algorithm described herein, using the classes of the neighboring pixels as bias on the classification (step 722). Note that not all neighboring pixels need to be considered for such influence. In other words, any number of immediate neighbor pixels can be used in step 722.

The application labels the selected pixel as a background pixel or a foreground pixel according to the classification bias from the neighboring pixels (step 724). The application repeats steps 718-724 for all pixels in the edge block.

The application determines whether more blocks created in step 704 remain to be processed in this manner (step 730). If more blocks remain ("Yes" path of step 730), the application returns process 700 to step 706 to select another block.

If no more blocks remain ("No" path of step 730), the application produces the completed mask layer, the foreground layer, and the background layer (step 732). The application optionally combines the layers into a compressed document, e.g., a PDF document (step 734). The application optionally outputs the compressed document, e.g., the PDF document as the compressed document (step 736). The application ends process 700 thereafter.

Thus, a computer implemented method, system or apparatus, and computer program product are provided in the illustrative embodiments for document compression with neighborhood biased pixel labeling. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for compressing a document, the method comprising:
    counting, using a processor and a memory, a number of edges present in a selected portion of the document;
    determining, using the processor and the memory, whether the number of edges exceeds a threshold number of edges;
    selecting, using the processor and the memory, responsive to the number of edges exceeding the threshold number of edges, a pixel from the portion;
    identifying, using the processor and the memory, for the pixel, a set of neighboring pixels;
    identifying, using the processor and the memory, for each neighboring pixel in a subset of the set of neighboring pixels, a corresponding label of the neighboring pixel, wherein a mask layer corresponding to the document contains labels of pixels in the portion;
    biasing, using the processor and the memory, in the mask layer, a label of the selected pixel using labels of neighboring pixels in the subset of the neighboring pixels;
    designating, using the processor and the memory, according to the label of the selected pixel, the selected pixel to one of a foreground layer corresponding to the document and a background layer corresponding to the document; and
    constructing, using the processor and the memory, corresponding to the document, a compressed document using the mask layer, the foreground layer, and the background layer.

2. The method of claim 1, wherein no intervening pixel is present between a neighboring pixel in the set of neighboring pixels and the pixel in the portion.

3. The method of claim 1, further comprising:
    receiving the document; and
    dividing the document into a set of blocks, each block in the set being of a specified size, wherein the portion is a block in the set of blocks.

4. The method of claim 3, further comprising:
    forming the blocks in the set of blocks such that at least one block in the set of blocks overlaps at least one other block in the set of blocks.

5. The method of claim 1, further comprising:
    determining whether a second portion of the document includes the threshold number of edges; and
    labeling, responsive to the second portion not including the threshold number of edges, all pixels in the second portion as belonging in the background layer.

6. The method of claim 1, further comprising:
    detecting an edge in the portion by determining whether a transition from a color of a first pixel in the portion to a color of a second pixel is greater than a threshold amount of transition.

7. The method of claim 6, further comprising:
    defining a set of threshold amounts of transitions, wherein the threshold amount of transition is a member of the set of threshold amounts of transitions; and
    using a different threshold amount of transition from the set of threshold amounts of transitions to detect a different type of edge in the portion.

8. The method of claim 1, wherein the subset of the set of neighboring pixels is the entire set of neighboring pixels.

9. The method of claim 1, wherein a plurality of foreground layers correspond to the document, each foreground layer in the plurality of foreground layer corresponding to a different label value of pixels in the document.

10. The method of claim 1, wherein a plurality of background layers correspond to the document, each background layer in the plurality of background layer corresponding to a different label value of pixels in the document.

11. The method of claim 1, further comprising:
completing constructing the mask layer, the foreground layer, and the background layer; and
combining, as a part of constructing, the completed mask layer, the completed foreground layer, and the completed background layer to form the compressed document.

12. The method of claim 11, wherein the combining uses a Portable Document Format (PDF), and the compressed document is a PDF document.

13. The method of claim 1, wherein the identifying, the biasing, and the designating comprises a Piecewise Homogeneous Labeling (PHL) method, and the PHL method modifies a Fuzzy C-Means method of pixel classification.

14. The method of claim 1, wherein the method is embodied in a computer program product comprising one or more computer-readable storage devices and computer-readable program instructions which are stored on the one or more computer-readable tangible storage devices and executed by one or more processors.

15. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

16. A computer program product for compressing a document, the computer program product comprising one or more computer-readable storage devices, and program instructions stored on at least one of the one or more storage devices, the stored program instructions comprising:
program instructions to count a number of edges present in a selected portion of the document;
program instructions to determine whether the number of edges exceeds a threshold number of edges;
program instructions to select, responsive to the number of edges exceeding the threshold number of edges, a pixel from the portion;
program instructions to identify, for the pixel, a set of neighboring pixels;
program instructions to identify, for each neighboring pixel in a subset of the set of neighboring pixels, a corresponding label of the neighboring pixel, wherein a mask layer corresponding to the document contains labels of pixels in the portion;
program instructions to bias, in the mask layer, a label of the selected pixel using labels of neighboring pixels in the subset of the neighboring pixels;
program instructions to designate, according to the label of the selected pixel, the selected pixel to one of a foreground layer corresponding to the document and a background layer corresponding to the document; and
program instructions to construct, corresponding to the document, a compressed document using the mask layer, the foreground layer, and the background layer.

17. The computer program product of claim 16, wherein no intervening pixel is present between a neighboring pixel in the set of neighboring pixels and the pixel in the portion.

18. The computer program product of claim 16, further comprising:
program instructions to receive the document; and
program instructions to divide the document into a set of blocks, each block in the set being of a specified size, wherein the portion is a block in the set of blocks.

19. The computer program product of claim 18, further comprising:
program instructions to form the blocks in the set of blocks such that at least one block in the set of blocks overlaps at least one other block in the set of blocks.

* * * * *